(12) United States Patent
Toles

(10) Patent No.: US 6,909,365 B2
(45) Date of Patent: Jun. 21, 2005

(54) CHILD SAFETY SEAT ALARM SYSTEM AND METHOD THEREFOR

(76) Inventor: Sandra Blake Toles, P.O. Box 93743, Las Vegas, NV (US) 89193

( * ) Notice: Subject to any disclaimer, the term of this patent is extended or adjusted under 35 U.S.C. 154(b) by 10 days.

(21) Appl. No.: 10/338,072

(22) Filed: Jan. 6, 2003

(65) Prior Publication Data

US 2003/0132838 A1 Jul. 17, 2003

Related U.S. Application Data

(60) Provisional application No. 60/345,840, filed on Jan. 7, 2002.

(51) Int. Cl.[7] .............................................. B60Q 1/00
(52) U.S. Cl. ..................... 340/457; 340/687; 340/667; 340/457.1; 340/457.2
(58) Field of Search .................................. 340/457, 687, 340/667, 457.1, 457.2

(56) References Cited

U.S. PATENT DOCUMENTS

| | | | | |
|---|---|---|---|---|
| 5,793,291 A | * | 8/1998 | Thornton | 340/573.1 |
| 6,104,293 A | * | 8/2000 | Rossi | 340/573.1 |
| 6,489,889 B1 | * | 12/2002 | Smith | 340/457 |
| 6,535,137 B1 | * | 3/2003 | Ryan | 340/687 |

* cited by examiner

*Primary Examiner*—Tai T. Nguyen

(57) ABSTRACT

A child safety seat comprises a safety seat unit. An alarm unit is coupled to the safety seat unit. The alarm unit sounds an alarm to remind occupants of the vehicle when a child is sitting in the child safety seat after the ignition of the vehicle in which the child safety seat is installed is turned off.

1 Claim, 3 Drawing Sheets

CHILD SAFETY SEAT ALARM SYSTEM AND METHOD THEREFOR

RELATED APPLICATIONS

This patent application is claiming the benefit of the U.S. Provisional Application having an application No. 60/345,840, filed Jan. 7, 2002, in the name of Sandra Blake Toles, and entitled "REMEMBER BABY".

BACKGROUND OF THE INVENTION

1. Field of the Invention

This invention relates to child safety seats and, more specifically, to an improved child safety seat which has an alarm system to remind occupants in a vehicle that a child is occupying the child safety seat once the ignition in the vehicle is deactivated.

2. Description of the Prior Art

Child safety is always on the forefront of most peoples' minds. This is due to the fact that young children are unable to take care of themselves. Because of this, extra precaution is used to ensure a child's safety.

In most moving vehicles, child safety seats are required for children under a certain weight. While child safety seats do work if installed and used correctly, they do have one serious drawback. Some adults have unintentionally left there children in these safety seats after they have arrived at their attended destination. Police and Fire Department statistics have shown that each year numerous emergency calls are received as a result of children left unattended in vehicles. Many of these accidents result in injury or death to the child.

A need therefore exists for an improved child safety seat. The improved child safety seat will provide an alarm should a child be left in the safety seat when the vehicle's ignition is disengaged.

SUMMARY OF THE INVENTION

In accordance with one embodiment of the present invention, it is an object of the present invention to provide an improved child safety seat.

It is another object of the present invention to provide an improved child safety seat that will provide an alarm should a child be left in the safety seat when the vehicle's ignition is disengaged.

BRIEF DESCRIPTION OF THE EMBODIMENTS

In accordance with one embodiment of the present invention, a child safety seat is disclosed. The child safety seat comprises a safety seat. An alarm unit is coupled to the safety seat. The alarm unit sounds an alarm to remind occupants of the vehicle when a child is sitting in the child safety seat after the ignition of the vehicle in which the child safety seat is installed is turned off.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

The invention itself, as well as a preferred mode of use, and advantages thereof, will best be understood by reference to the following detailed description of illustrated embodiment when read in conjunction with the accompanying drawings, wherein like reference numerals and symbols represent like elements.

DETAILED DESCRIPTION OF THE PREFERRED EMBODIMENT

Figure 1:
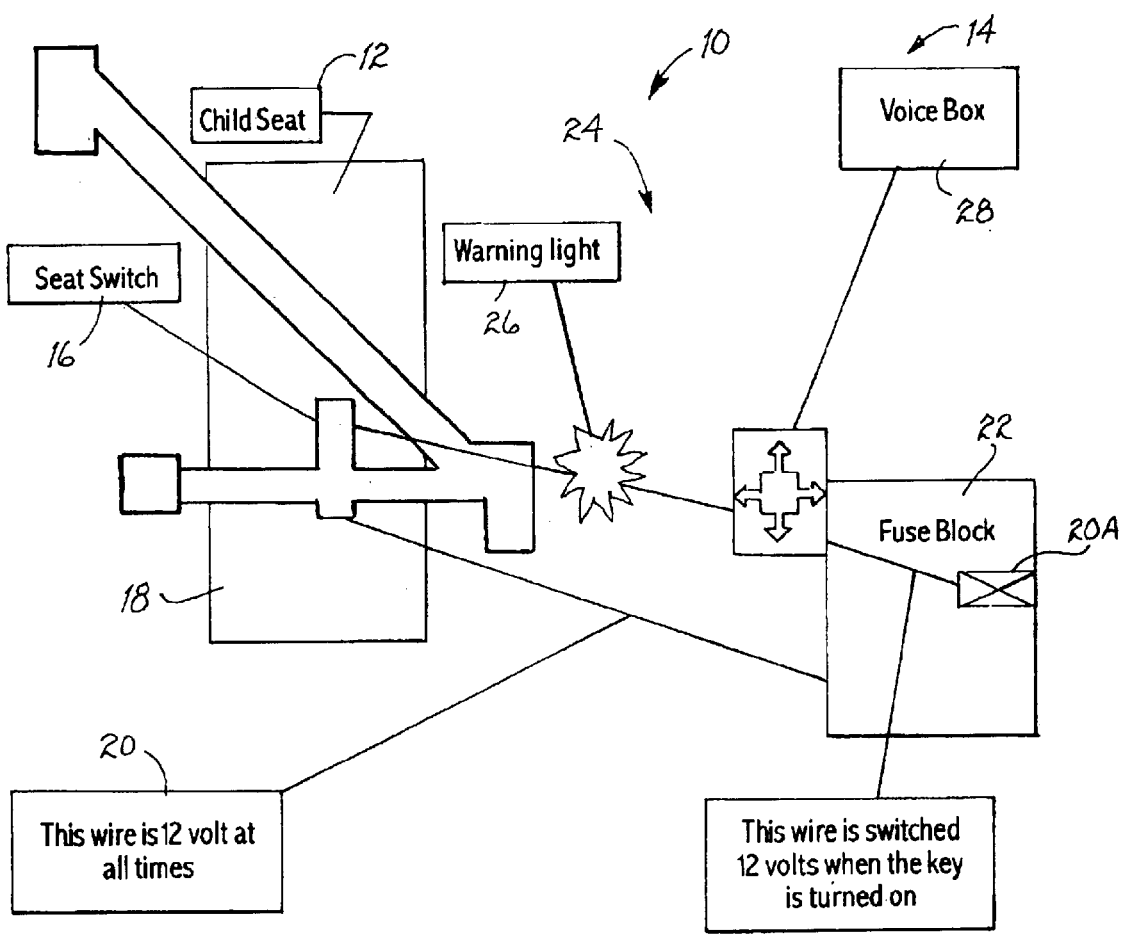
FIG. 1 is a simplified functional block diagram of the child safety seat having an alarm system of the present invention.
Figure 2:
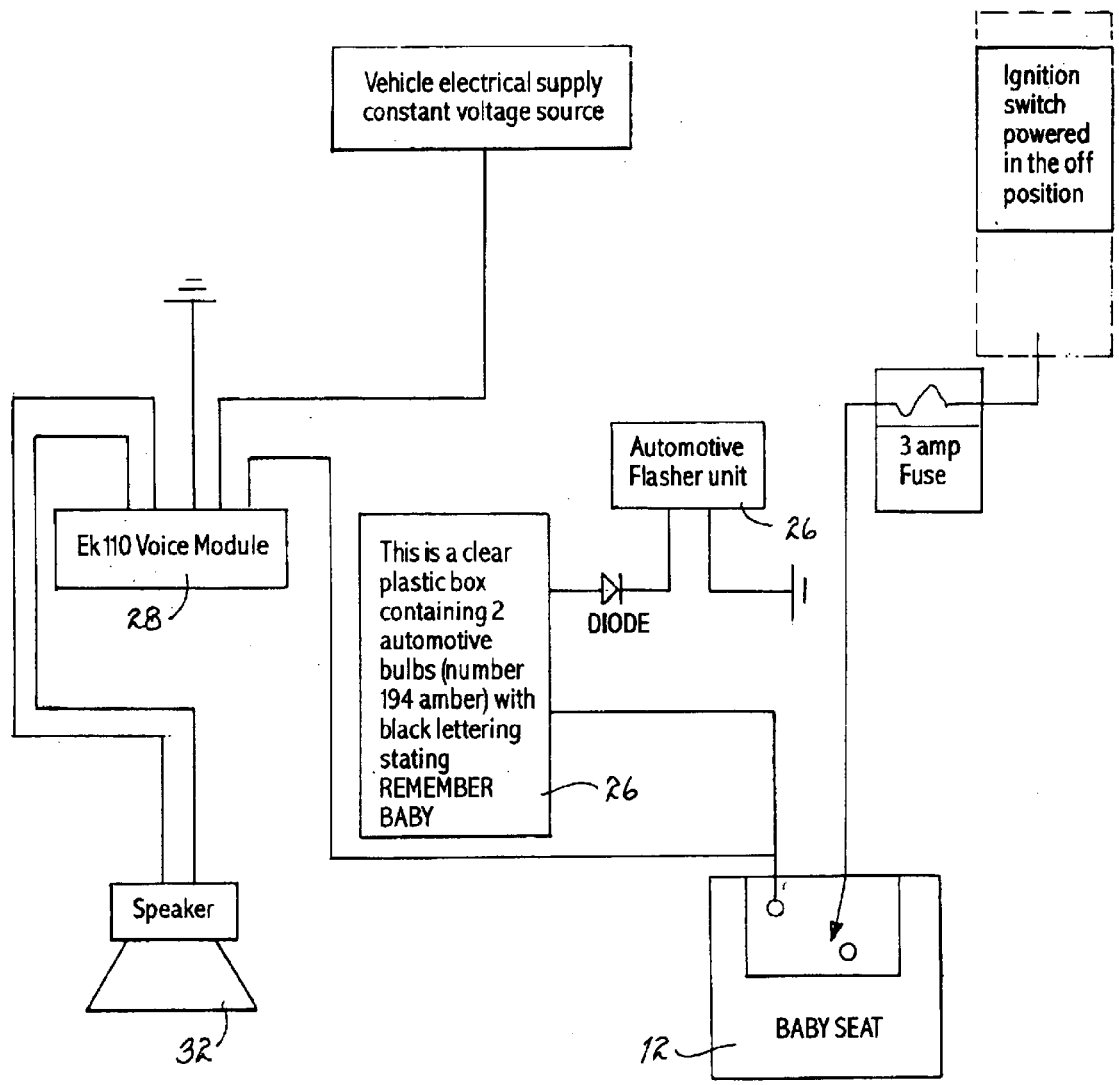
FIG. 2 is a simplified electrical schematic of the child safety seat having an alarm system of the present invention.
Figure 3:
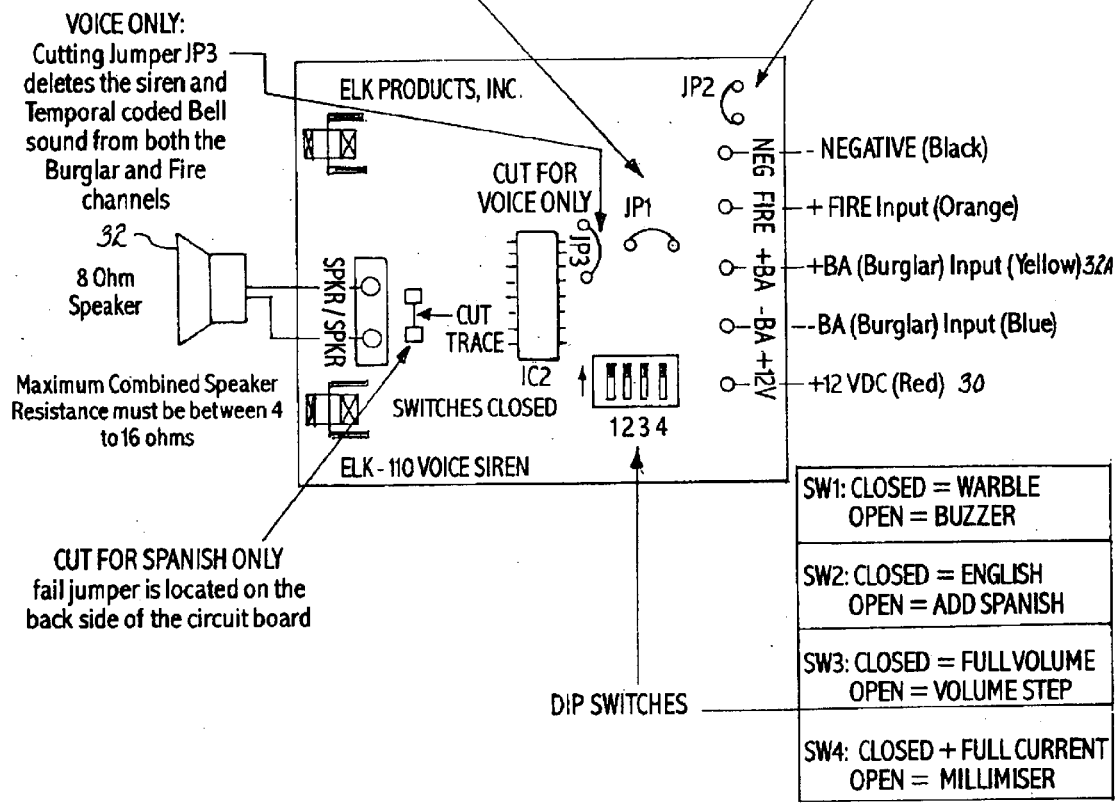
FIG. 3 is an electrical schematic of the voice box used in the child safety seat having an alarm system of the present invention.

Referring to the Figures a child safety seat having an alarm system 10 (hereinafter safety seat 10) is shown. The safety seat 10 is designed to provide an alarm signal to remind occupants of the vehicle to remove the child from the safety seat 10 when the ignition of the vehicle is disengaged.

The safety seat 10 is comprised of a standard child safety seat 12. The child safety seat 12 can be any type of child safety seat from any manufacturer. The child safety seat 12 is coupled to an alarm unit 14. The alarm unit 14 will give audible and/or visual warnings to occupants of a vehicle in which the safety seat 10 is installed. The alarm unit 14 will signal when a child has been left in the safety seat 10 after the ignition of the vehicle has been turned off.

The alarm unit 14 has a seat switch 16. The seat switch 16 is located in the seat section 18 of the child safety seat 12. The seat switch 16 is coupled to a power supply 20. The power supply can be a 12 volt power supply or the like. The power supply 20 is used to power the seat switch 16. When a child is placed in the safety seat 10, the weight of the child will activate the seat switch 16. Once activated, an electrical connection is made to a fuse 20A in a fuse box 22. The fuse box 22 may be a standard fuse box 22 located in the vehicle where the safety seat 10 is installed. The fuse 2 is powered when the ignition switch of the vehicle is activated.

A signaling unit 24 is coupled to the line connecting the seat switch 16 to the fuse 20 of the fuse box 22. The signaling unit 24 may be comprised of a visual alarm unit 26 and/or a audible alarm unit 28. The visual alarm unit 26 may be a warning light or the like. The audible alarm unit 28 may be a sound module, a voice module or the like.

In accordance with one embodiment of the present invention, the audible alarm unit 28 has two positive feed connections. A first positive feed connection 30 is coupled to a constant vehicle voltage. The constant vehicle voltage can be supplied from the fuse box 22. The second positive feed connection 32A comes from the ignition switch of the vehicle and is coupled to the seat switch 16. The audible alarm unit 28 is further coupled to the chassis ground of the vehicle. In order for the audible alarm unit 28 to be heard, the speaker connectors of the audible alarm unit 28 need to be coupled to a speaker 32.

The line coming from the safety seat 12 is spliced. One line enters the audible alarm unit 28. The other line enters the visual alarm unit 26. In accordance with one embodiment of the present invention, the visual alarm unit 26 is comprised of a clear box which says "REMEMBER BABY". The visual alarm unit will house one or more light bulbs. The wire that enters the visual alarm unit 26 has a diode in-line and connects to the vehicle's flasher unit, which is connected to the chassis ground of the vehicle.

In operation, when a child is sitting in the safety seat 10, the seat switch 16 is activated by the weight of the child. A connection is made to the fuse box 22. When the vehicle's ignition is activated, there is no ground supplied to the alarm unit 14. When the vehicle's ignition is turned off, the ground is supplied. If a child remains in the safety seat 10 after the ignition is turned off, the alarm unit 14 will illuminate a light and/or activate an audible signal to remind occupants in the vehicle about the child in the safety seat 10. The alarm unit 14 will continue to remind occupants that the child is in the safety seat until the child is removed.

While the invention has been particularly shown and described with reference to preferred embodiments thereof, it will be understood by those skilled in the art that the foregoing and other changes in form and details may be made therein without departing from the spirit and scope of the invention. The voice set module can produce a voice message in any desirable language set.

What is claimed is:

1. A child safety seat comprising:

A safety seat located in a vehicle;

An alarm unit coupled to the safety seat, which sounds an alarm to remind occupants when a child is sitting in the safety seat after an ignition of a vehicle in which the safety seat is installed is turned off, the alarm unit comprising:

a seat switch located in the child safety seat for detecting a present of a child sitting therein, wherein the seat switch generating a present detection signal to the alarm unit after the ignition of the vehicle is turned off;

a constant power source coupled to the seat switch for providing operating power to the alarm unit;

a fuse box coupled to the seat switch and to the power source which supplies power when the ignition of the vehicle is turned on; and a signaling unit coupled to the fuse box and the seat switch, wherein the signaling unit including a voice module that can be programmed in various languages, to provide a voice message signal in any desired languages when the child is placed in the safety seat and after the ignition of the vehicle is turn off, the signaling unit further comprises a visual alarm unit that illuminates in synchronization with the voice message to alert the occupants that the child has been left inside the vehicle after the ignition of the vehicle is turned off.

* * * * *